United States Patent
Lee

(10) Patent No.: US 8,760,511 B2
(45) Date of Patent: Jun. 24, 2014

(54) MONITORING CAMERA, METHOD OF CONTROLLING THE SAME, AND RECORDING MEDIUM STORING PROGRAM FOR EXECUTING THE METHOD

(75) Inventor: Jae-hoon Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 752 days.

(21) Appl. No.: 12/686,505

(22) Filed: Jan. 13, 2010

(65) Prior Publication Data

US 2011/0013017 A1  Jan. 20, 2011

(30) Foreign Application Priority Data

Jul. 16, 2009 (KR) .................. 10-2009-0064943

(51) Int. Cl.
*H04N 7/18* (2006.01)
(52) U.S. Cl.
USPC .......................................................... 348/143
(58) Field of Classification Search
CPC .......... H04N 5/232; H04N 7/18; H04N 7/183
USPC .......................................................... 348/143
See application file for complete search history.

(56) References Cited

U.S. PATENT DOCUMENTS

| | | | |
|---|---|---|---|
| 6,714,236 B1 * | 3/2004 | Wada et al. .................. | 348/152 |
| 6,766,098 B1 * | 7/2004 | McGee et al. ............... | 386/241 |
| 7,277,237 B2 * | 10/2007 | Saito et al. .................. | 359/698 |
| 2004/0114791 A1 * | 6/2004 | Atkinson ..................... | 382/131 |
| 2006/0203098 A1 * | 9/2006 | Henninger et al. ....... | 348/211.99 |
| 2008/0158394 A1 * | 7/2008 | Kim ......................... | 348/240.99 |

FOREIGN PATENT DOCUMENTS

| | | |
|---|---|---|
| JP | 2005-150902 A | 6/2005 |
| JP | 2007-143058 A | 6/2007 |
| KR | 10-2006-0002674 A | 1/2006 |
| KR | 10-2006-0037610 A | 5/2006 |

* cited by examiner

*Primary Examiner* — Sath V Perungavoor
*Assistant Examiner* — Jeffery Williams
(74) *Attorney, Agent, or Firm* — Sughrue Mion, PLLC

(57) ABSTRACT

A monitoring camera and a method of controlling the monitoring camera are provided. The monitoring camera includes: a data receiving unit receiving a signal from a terminal; an image acquiring unit having a zoom lens and an imaging device generating first image data of an original image, and further, generates second image data of a user-selected region by performing at least one of zooming, panning and tilting based on control data; a data transmitting unit transmitting the first image data and the second image data generated by the imaging device to the terminal; a control unit including at least one of a zoom control unit controlling the zoom lens according to a zoom value, a pan control unit panning the image acquiring unit according to a pan value and a tilt control unit tilting the image acquiring unit according to a tilt value; a memory storing the control data.

21 Claims, 8 Drawing Sheets

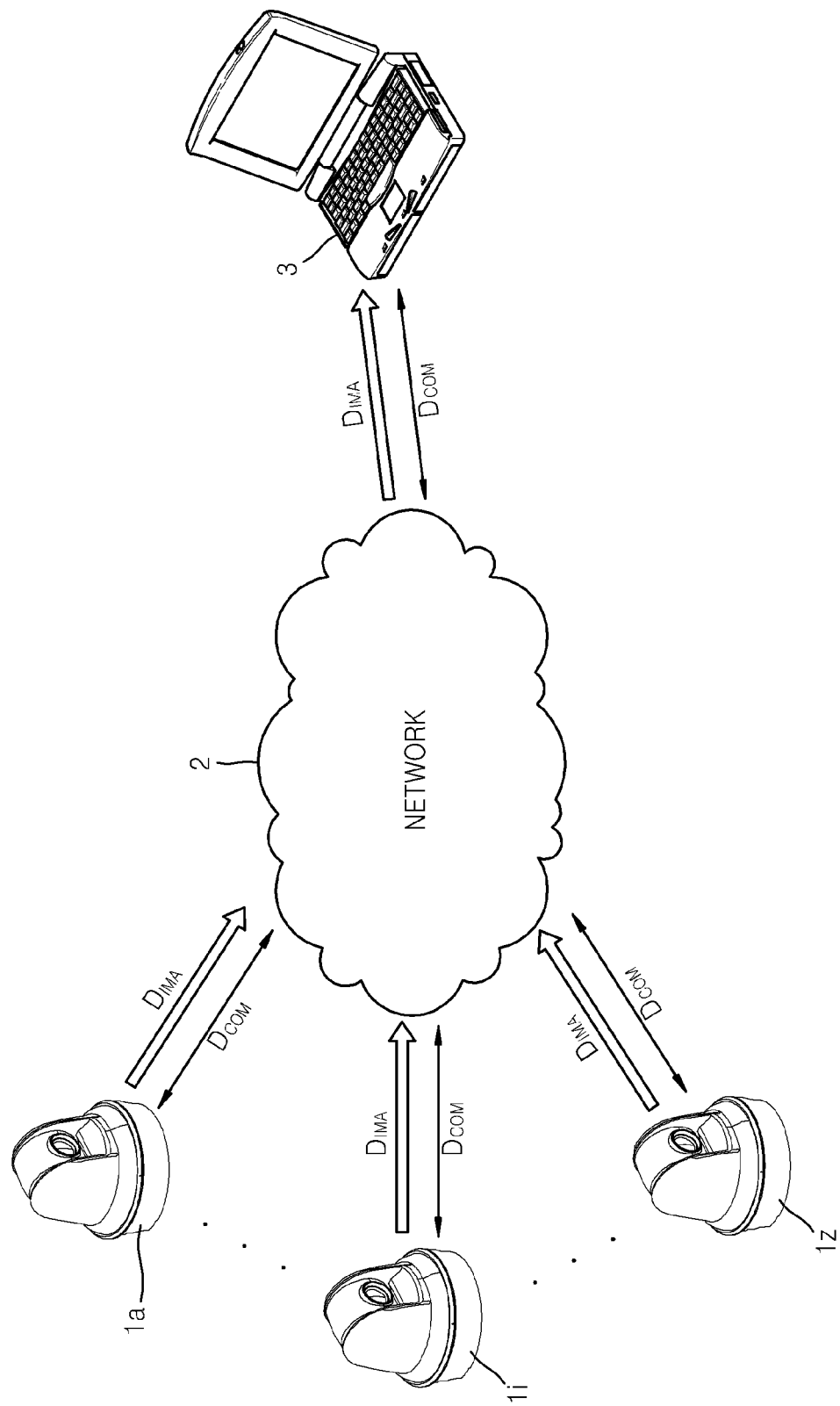

MONITORING CAMERA, METHOD OF CONTROLLING THE SAME, AND RECORDING MEDIUM STORING PROGRAM FOR EXECUTING THE METHOD

CROSS-REFERENCE TO RELATED PATENT APPLICATION

This application claims priority from Korean Patent Application No. 10-2009-0064943, filed on Jul. 16, 2009, in the Korean Intellectual Property Office, the disclosure of which is incorporated herein in its entirety by reference.

BACKGROUND

1. Field of the Invention

Apparatuses and methods consistent with the present inventive concept relate to a monitoring camera and a method of controlling the same, and a computer readable recording medium storing a program for executing the method.

2. Description of the Related Art

In general, when a monitoring camera is connected to a terminal via a network, the monitoring camera transmits acquired image data to the terminal via the network, and the terminal displays a live-view video image corresponding to the acquired image data. The live-view video image, which is a real-time video image, is displayed on a display unit of the terminal. The monitoring camera may be controlled by receiving a control signal from the terminal via the network.

When using the monitoring camera, a user may select a certain region of the live-view video image displayed on the display unit of the terminal to enlarge the certain region, and allow the enlarged certain region to be fully displayed on the display unit of the terminal. In this case, the monitoring camera receives information about the certain region from the terminal, and performs zooming on the certain region. However, the monitoring camera often fails to perform zooming on the certain region, and may perform zooming on a region other than the certain region due to an error.

SUMMARY

Exemplary embodiments of the present inventive concept provide a monitoring camera that can detect and correct an error that occurs during zooming/panning/tilting performed on a region selected by a user, a method of controlling the monitoring camera, and a recording medium storing a program for executing the method.

According to an exemplary embodiment, there is provided a monitoring camera performing zooming and at least one of panning and tilting according to a signal transmitted from a terminal, the monitoring camera including: an image acquiring unit including a zoom lens, and an imaging device which obtains first image data of an original image, and further, generates second image data of a region, included in the original image, which is selected by a user through the signal transmitted from the terminal, through the zooming and the at least one of the panning and the tilting based on control data; a data transmitting unit which transmits the second image data generated by the imaging device to the terminal; a control unit including a zoom control unit, which controls the zoom lens according to a zoom value, and at least one of a pan control unit, which pans the image acquiring unit according to a pan value, and a tilt control unit which tilts the image acquiring unit according to a tilt value; a memory which stores the control data including: a set of zoom values for corresponding zoom positions, each zoom value being used by the zoom control unit to move the zoom lens so that the image acquiring unit changes from one zoom position to another zoom position; and at least one of a set of pan values, each pan value being used by the pan control unit to pan by one (1) pixel of image data generated at a corresponding zoom position, and a set of tilt values, each tilt value being used by the tilt control unit to tilt by one (1) pixel of image data generated at the corresponding zoom position.

In order to generate the second image data of the selected region, the control unit may determine, from the control data stored in the memory, a zoom value used by the zoom control unit to move the zoom lens according to a ratio of a size of the original image to a size of the image of the selected region, and at least one of a pan value at a current zoom position according to a number of horizontal pixels from a center of the original image to a center of the image of the selected region, and a tilt value at the current zoom position according to a number of vertical pixels from the center of the original image to the center of the image of the selected region, and the zoom control unit may perform the zooming using the zoom lens according to the zoom value, the pan control unit may perform the panning using the image acquiring unit according to the pan value, and the tilt control unit may perform the tilting using the image acquiring unit according to the tilt value.

The error detecting unit may detect errors of the control data by comparing first image data, wherein the first image data is data of the image of the first region displayed on the terminal, with second image data, wherein the second image data is data of the image of the second region generated after zoom lens control, panning, and tilting on the second region selected by a user are completed.

The monitoring camera may further include an error detecting unit which detects an error of the control data. The error detecting unit may perform frequency conversion on the first image data and the second image data, and detect the error of the control data by comparing the first image data with the second image data on which the frequency conversion has been performed.

The error detecting unit may detect at least one of a center coordinate error and a rotation angle error between the first image data and the second image data.

The error detecting unit may detect at least one of the center coordinate error and the rotation angle error by performing at least one of size change, rotation and scaling on the second image data on which the frequency conversion has been performed, and acquiring at least one of a size change value, a rotation value and a scaling value when the second image data on which the at least one of the size change, the rotation and the scaling have been performed is identical to a part of the first image data.

The error detecting unit may update the control data stored in the memory with new control data obtained from the error of the control data.

According to another aspect of the present invention, there is provided a method of controlling a monitoring camera that performs zooming and at least one of panning and tilting according to a signal transmitted from a terminal, the method including: transmitting first image data of an original image, obtained by an image acquiring unit of the monitoring camera, to the terminal so that the original image is displayed on the terminal; receiving the signal, indicating to display on the terminal an image of a region which is selected by a user, from the terminal; performing the zooming and the at least one of the panning and the tilting according to the signal based on control data; and generating and transmitting to the terminal second image data of the selected region for display on the terminal, wherein the control data includes: a set of zoom values for corresponding zoom positions, each zoom value being used by a zoom control unit of the monitoring camera to move a zoom lens of the monitoring camera so that an image acquiring unit of the monitoring camera changes from one zoom position to another zoom position; and at least one of a set of pan values, each pan value being used by a pan control unit of the monitoring camera to pan by one (1) pixel of image data generated at a corresponding zoom position, and a set of tilt values, each tilt value being used by a tilt control unit of the monitoring camera to tilt by one (1) pixel of image data generated at the corresponding zoom position.

The performing the zooming and the at least one of the panning and the tilting may include: determining from the control data a zoom value used by the zoom control unit to move the zoom lens according to a ratio of a size of the original image to a size of the image of the selected region; determining from the control data at least one of a pan value at a current zoom position according to a number of horizontal pixels from a center of the original image to a center of the image of the selected region, and a tilt value at the current zoom position according to a number of vertical pixels from the center of the image of the original image to the center of the image of the selected region; and allowing the zoom control unit to control the zoom lens according to the zoom value, the pan control unit to pan the image acquiring unit according to the pan value, and the tilt control unit to tilt the image acquiring unit according to the tilt value.

The method of controlling the monitoring camera may further include detecting an error of the control data by comparing the first image data with the second image data.

The detecting the error may include: performing frequency conversion on the first image data and the second image data; and detecting the error of the control data by comparing the first image data with the second image data on which the frequency conversion has been performed.

The detecting the error of the control data may include detecting at least one of a center coordinate error and a rotation angle error between the first image data and the second image data.

The detecting the error of the control data may include: performing at least one of size change, rotation and scaling on the second image data on which the frequency conversion has been performed; acquiring at least one of a size change value, a rotation value a scaling value when the second image data on which the at least one of the size change, the rotation and the scaling has been performed is identical to a part of the first image data; and detecting the at least one of the center coordinate error and the rotation angle error by using the at least one of the size change value, the rotation value and the scaling value.

The method may further include updating the control data, which is stored in the memory, with new control data obtained from the error of the control data.

According to another exemplary embodiment, there is provided a computer readable recording medium having recorded thereon a program for executing the above-described method.

BRIEF DESCRIPTION OF THE DRAWINGS

The above and other aspects of the present inventive concept will become more apparent by describing in detail exemplary embodiments thereof with reference to the attached drawings, in which:

FIG. 1 is a conceptual view illustrating communication between monitoring cameras and a terminal via a network, according to an embodiment of the present invention;

DETAILED DESCRIPTION OF EXEMPLARY EMBODIMENTS

The present inventive concept will now be described more fully with reference to the accompanying drawings, in which exemplary embodiments of the invention are shown.

FIG. 1 is a conceptual view illustrating a communication scheme between a plurality of monitoring cameras $1a$, $1i$, and $1z$ and a terminal 3 via a network 2, according to an exemplary embodiment. Referring to FIG. 1, the plurality of cameras $1a$, $1i$, and $1z$ transmit data to the terminal 3 and receive data from the terminal 3. In detail, while the monitoring cameras $1a$, $1i$, and $1z$ communicate with the terminal 3 via a communication channel $D_{COM}$, the monitoring cameras $1a$, $1i$, and $1z$ transmit live-view video image data to the terminal 3 via an image data channel $D_{IMA}$. Although the current exemplary embodiment shows that the cameras $1a$, $1i$, and $1z$ communicate with the terminal 3 in FIG. 1, the present inventive concept is not limited thereto, and various modifications may be made, for example, only one monitoring camera may communicate with the terminal 3, or only one monitoring camera or a plurality of monitoring cameras may communicate with a plurality of terminals.

While the terminal 3 is a computer in FIG. 1, the present inventive concept is not limited thereto, and the monitoring cameras $1a$, $1i$, and $1z$ may communicate with any type of device having a display unit. In addition, the terminal 3 may store live-view video images received from the monitoring cameras $1a$, $1i$, and $1z$, if necessary.

Figure 2A:
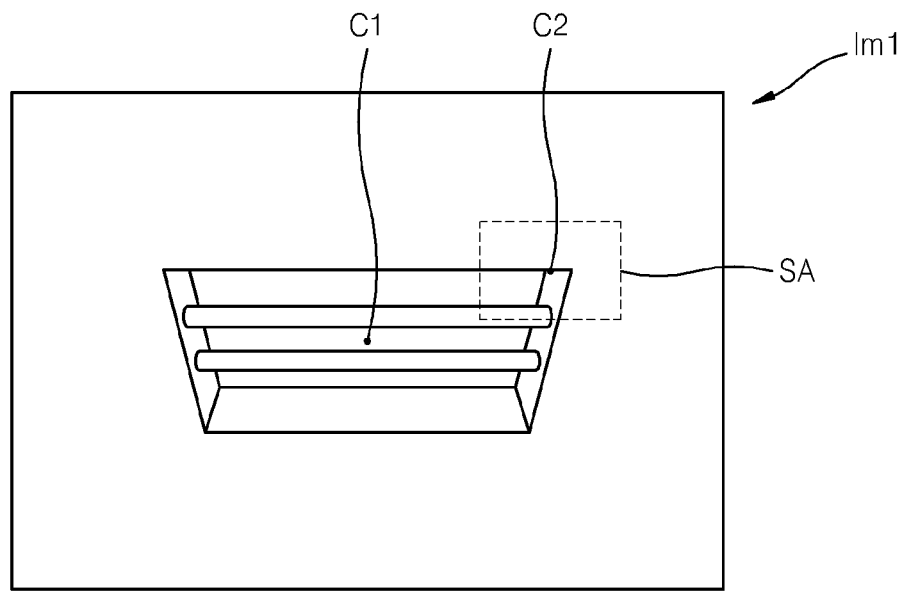
FIG. 2A is a conceptual view illustrating an image obtained from image data acquired by a monitoring camera, according to an embodiment of the present invention.
Figure 2B:
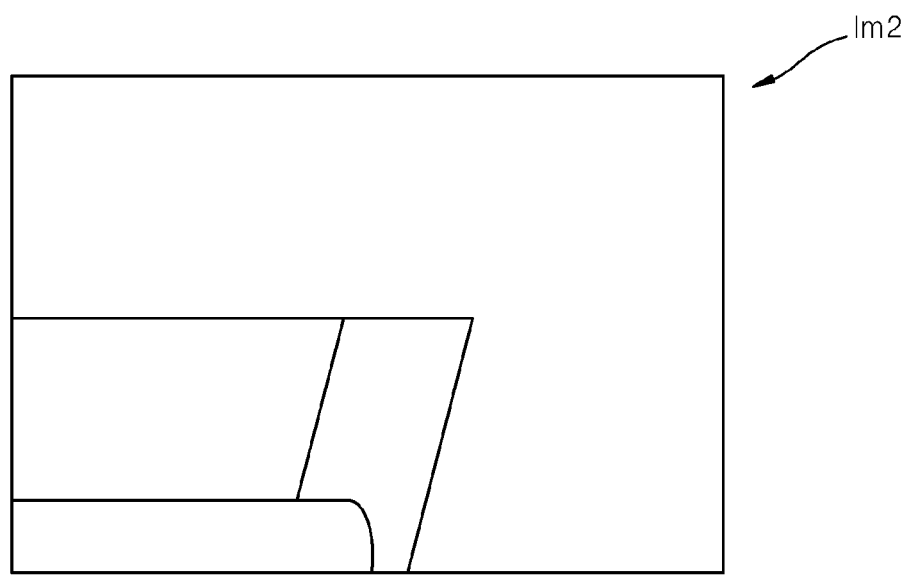
FIG. 2B is a conceptual view illustrating an image obtained from image data acquired by performing zooming on a second region, wherein the second region is selected by a user, of the image of FIG. 2A.
Figure 2C:
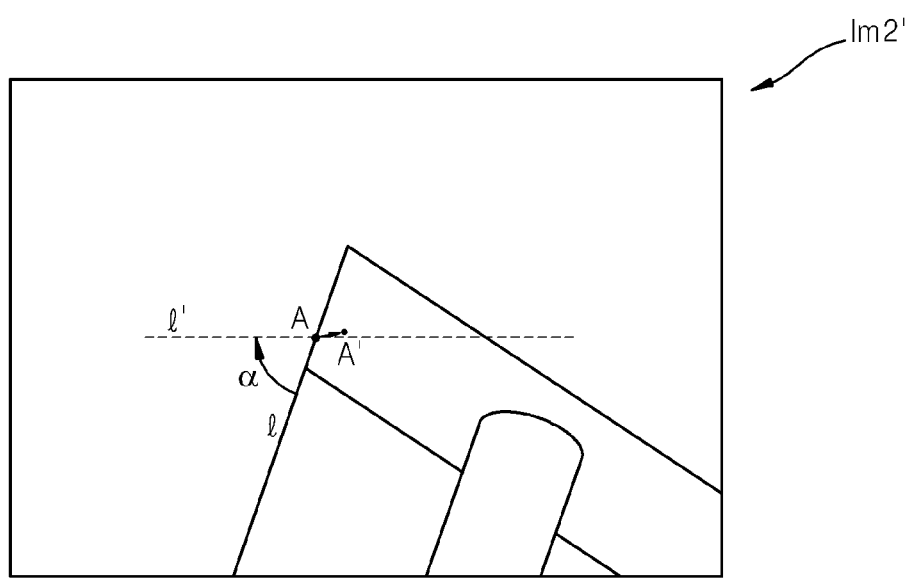
FIG. 2C is a conceptual view illustrating an image obtained from image data acquired by performing zooming on a region other than the second region of the image of FIG. 2A due to an error.

FIG. 2A is a conceptual view illustrating an image Im1 obtained from image data acquired by a monitoring camera, according to an exemplary embodiment. The entire image of FIG. 2A is referred to as a first region. FIG. 2B is a conceptual view illustrating an image Im2 obtained from image data acquired by performing zooming on a second region SA, which is selected by a user, of the image Im1 of FIG. 2A. FIG. 2C is a conceptual view illustrating an image Im2' obtained from image data acquired by performing zooming/panning/tilting on the second region SA of the image of FIG. 2A but having an error occurring during the zooming/panning/tilting. The term "image" may refer to one frame image of a live-view video image. FIGS. 2A through 2C are conceptual views illustrating images of a fluorescent lamp mounted on a ceiling of an office acquired by the monitoring camera.

In general, when an image obtained from data transmitted from the monitoring camera is the image of FIG. 2A, and a user selects the second region SA, which is a part of the first region of FIG. 2A, the monitoring camera performs zooming/panning/tilting in order to acquire image data of the second region SA.

The term "zooming" refers to changing a magnification. In FIGS. 2A and 2B, zooming-in is performed. If horizontal coordinates of a center C1 of the image Im1 and a center C2 of the second region SA are not identical to each other as shown in FIG. 2A, panning may be performed. The term "panning" refers to moving a part of the monitoring camera so that the horizontal coordinate of the center of an image acquired after the moving of the monitoring camera has been completed is identical to the horizontal coordinate of the center C2 of the second region SA. If vertical coordinates of the center C1 of the Im1 and the center C2 of the second region SA are not identical to each other as shown in FIG. 2A, tilting may be performed. The term "tilting" refers to moving a part of the monitoring camera so that the vertical coordinate of the center of an image acquired after the moving of the monitoring camera has been completed is identical to the vertical coordinate of the center C2 of the second region SA.

When an image obtained from data transmitted from the monitoring camera is the image of FIG. 2A and the user selects the second region SA, an image acquired after performing zooming/panning/tilting may not be the image of FIG. 2B, and instead, may be the image of FIG. 2C due to an error of the monitoring camera. This is because the second region SA, which is selected by the user, of the image displayed on a display unit of a terminal is represented by using two-dimensional (2D) coordinates whereas panning/tilting of the monitoring camera is controlled by using three-dimensional (3D) coordinates. In order to reduce an error during such 2D-3D conversion, pixel data must go through 2D-3D conversion by using a complex algorithm, such as perspective projection. To this end, the performance of a central processing unit (CPU) or the like mounted in the monitoring camera to perform 2D-3D conversion on the pixel data should be drastically enhanced, thereby greatly increasing manufacturing costs of the monitoring camera.

Figure 3:
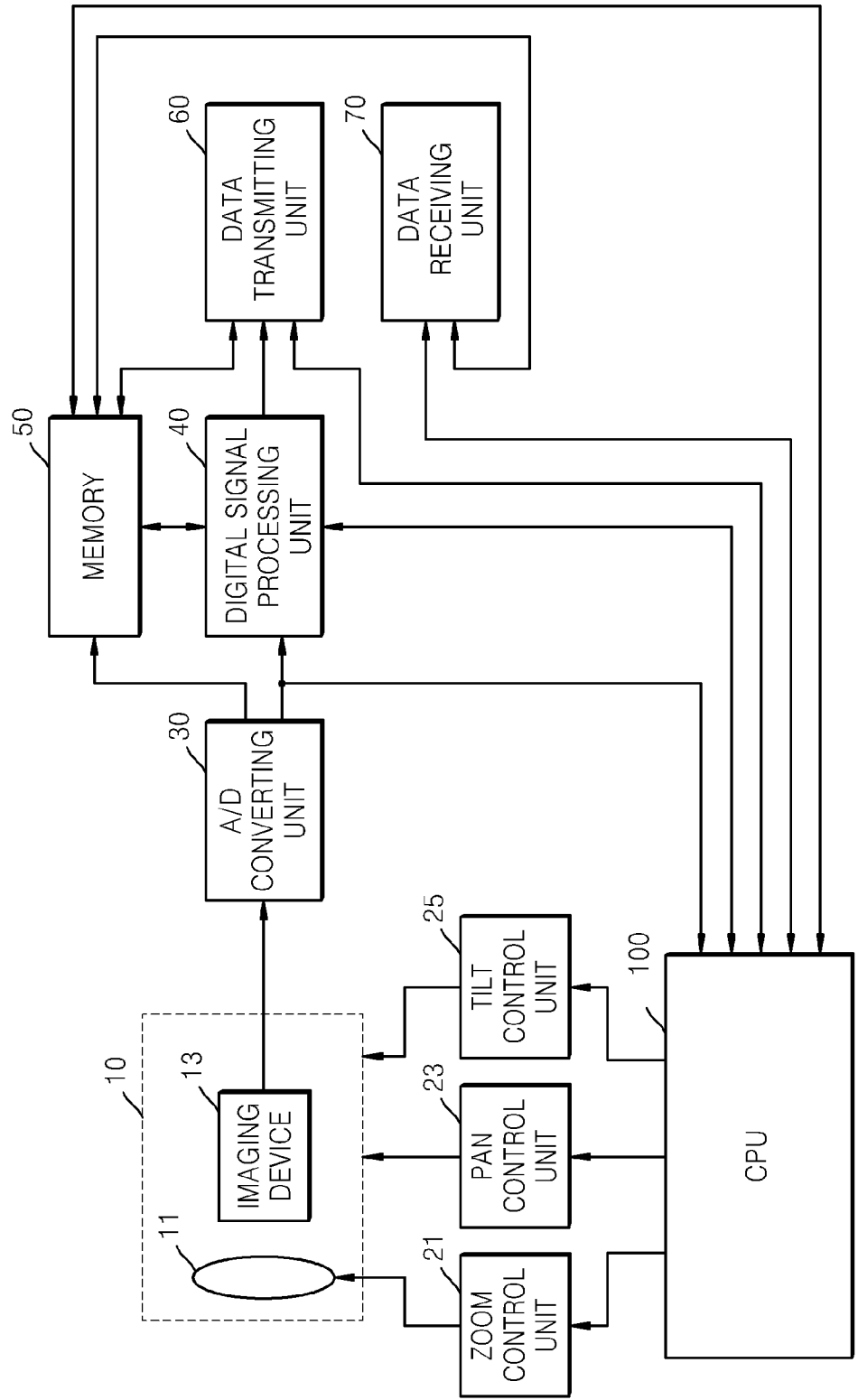
FIG. 3 is a block diagram of a monitoring camera according to an embodiment of the present invention.

FIG. 3 is a block diagram of a monitoring camera according to an exemplary embodiment. Referring to FIG. 3, the monitoring camera includes a data receiving unit 70, an image acquiring unit 10, a zoom control unit 21, a pan control unit 23, a tilt control unit 25, a data transmitting unit 60, and a memory 50. The monitoring camera may further include an analogue/digital (A/D) converting unit 30, a digital signal processing unit 40, and a CPU 100, if necessary.

The data receiving unit 70 receives data transmitted from a terminal via a network. The image acquiring unit 10 includes a lens unit including a zoom lens 11, and an imaging device 13 generating image data from light passing through the lens unit and incident on the imaging device 13. As an electrical signal is applied to the CPU 100 according to a user's input from the terminal via the network, the CPU 100 detects the electrical signal, and controls the zoom control unit 21, the pan control unit 23, and the tilt control unit 25 to respectively control a position of the zoom lens 11 and panning and tilting of the image acquiring unit 10. In detail, the zoom control unit 21 controls the zoom lens 11 according to a zoom value, the pan control unit 23 pans the image acquiring unit 10 according to a pan value, and the tilt control unit 25 tilts the image acquiring unit 10 according to a tilt value.

The imaging device 13 generates data from input light, and the A/D converting unit 30 converts analogue data output from the imaging device 13 into digital data. The A/D converting unit 30 may not be required depending on the characteristics of the imaging device 13.

The data generated by the imaging device 13 may be input to the digital signal processing unit 40 directly or through the memory 50. If necessary, the data generated by the imaging device 13 may be input to the CPU 100. Examples of the memory 50 include a read-only memory (ROM) and a random access memory (RAM). The digital signal processing unit 40 may perform digital signal processing, such as gamma correction or white balance adjustment, if necessary.

Data output from the digital signal processing unit 40 is transmitted to the data transmitting unit 60 directly or through the memory 50. The data transmitting unit 60 transmits image data to the terminal via the network so that a display unit of the terminal may display an image. The term "image" may refer to one frame image of a live-view video image that is a real-time video image.

The memory 50 stores control data. The control data includes three types of data. The control data includes a zoom value used by the zoom control unit 21 to move the zoom lens 11 so that the image acquiring unit 10 changes from one zoom position to another zoom position. The control data includes a pan value (or a pan value per pixel) at each zoom position used by the pan control unit 23 to pan by one (1) pixel of image data generated at each zoom position. The control data includes a tilt value (or a tilt value per pixel) at each zoom position used by the tilt control unit 25 to tilt by one (1) pixel of image data generated at each zoom position.

The pan value at each zoom position used to pan by one (1) pixel of image data may be obtained by obtaining a pan value at each zoom position for minimally panning the image acquiring unit 10 in order for a portion included in an image obtained from data generated by the imaging device 13 at a first pan position not to be included in an image obtained from data generated by the imaging device 13 at a second pan position, and dividing the pan value by the number of horizontal pixels of the monitoring camera.

The tilt value at each zoom position used to tilt by one (1) pixel of image data may be obtained by obtaining a tilt value at each zoom position for minimally tilting the image acquiring unit 10 in order for a portion included in an image obtained from data generated by the imaging device 13 at a first tilt position not to be included in an image obtained from data generated by the imaging device 13 at a second tilt position, and dividing the tilt value by the number of vertical pixels of the monitoring camera.

An example of the control data is shown in Table 1.

TABLE 1

| Zoom position | Zoom value | Total pan value | Pan value per pixel | Total tilt value | Tilt value per pixel |
|---|---|---|---|---|---|
| 1 | 0 | 2458 | 7.0228 | 1525 | 5.4078 |
| 2 | 50 | 2329 | 6.6542 | 1438 | 5.0992 |
| 3 | 100 | 2185 | 6.2428 | 1350 | 4.7872 |
| 4 | 150 | 2045 | 5.8428 | 1263 | 4.4787 |
| 5 | 200 | 1915 | 5.4714 | 1185 | 4.2021 |
| 6 | 250 | 1785 | 5.1 | 1108 | 3.9290 |
| 7 | 300 | 1660 | 4.7428 | 1033 | 3.6631 |
| 8 | 350 | 1540 | 4.4 | 957 | 3.3936 |
| 9 | 400 | 1427 | 4.0771 | 883 | 3.1312 |
| 10 | 450 | 1320 | 3.7714 | 815 | 2.8900 |
| 11 | 500 | 1219 | 3.4828 | 755 | 2.6773 |

TABLE 1-continued

| Zoom position | Zoom value | Total pan value | Pan value per pixel | Total tilt value | Tilt value per pixel |
|---|---|---|---|---|---|
| 12 | 550 | 1120 | 3.2 | 690 | 2.4468 |
| 13 | 600 | 1028 | 2.9371 | 633 | 2.2446 |
| 14 | 650 | 936 | 2.6742 | 575 | 2.0390 |
| 15 | 700 | 850 | 2.4285 | 520 | 1.8439 |
| 16 | 750 | 770 | 2.2 | 469 | 1.6631 |

In Table 1, the monitoring camera has 350×282 pixels.

Typically, the zoom control unit 21 includes a stepper motor. When a revolution number of the stepper motor is 50 at a given zoom position, the zoom lens 11 is moved from one zoom position to a next zoom position. Assuming that a zoom position at which the stepper motor has a revolution number of 0 is a first zoom position and a next zoom position at which the stepper motor has a revolution number of 50 is a second zoom position, in order to move the zoom lens 11 from the first zoom position to the second zoom position, the stepper motor should have a revolution number of 50. Likewise, if the stepper motor has a revolution number of 100 when the zoom lens 11 is at the first zoom position, the position of the zoom lens 11 becomes a third zoom position. If the stepper motor has a revolution number of 50 when the zoom lens 11 is at the second zoom position, the position of the zoom lens 11 may become the first zoom position or the third zoom position depending on a revolution direction of the stepper motor.

Typically, the pan control unit 23 also includes a stepper motor. If the stepper motor of the pan control unit 23 may have a maximum revolution number of 2458 when the zoom lens 11 is at the first zoom position, the image acquiring unit 10 may be horizontally rotated so that a portion included in an image obtained from data generated by the imaging device 13 at a first pan position before the rotation does not overlap with a portion included in an image obtained from data generated by the imaging device 13 at a second pan position after the rotation. In detail, a portion included in the image obtained from the data generated by the imaging device 13 at the first pan position is not included in the image obtained from the data generated by the imaging device 13 at the second pan position. If the stepper motor has a revolution number higher than 2458, the portion included in the image obtained from the data generated by the imaging device 13 at the first pan position is also not included in the image obtained from the data generated by the imaging device 13 at the second pan position. However, if the stepper motor has a revolution number less than 2458, at least a part of the portion included in the image obtained from the data generated by the imaging device 13 at the first pan position is included in the image obtained from the data generated by the imaging device 13 at the second pan position.

Typically, the tilt control unit 25 also includes a stepper motor. When the zoom lens 11 is at the first zoom position, if the stepper motor of the tilt control unit 25 may have a maximum revolution number of 1525, the image acquiring unit 10 may be vertically rotated so that a portion included in an image obtained from data generated by the imaging device 13 at a first tilt position before the rotation does not overlap with a portion included in an image obtained from data generated by the imaging device 13 at a second tilt position after the rotation are different from each other. In detail, a portion included in the image obtained from the data generated by the imaging device 13 at the first tilt position is not included in the image obtained from the data generated by the imaging device 13 at the second tilt position. If the stepper motor has a revolution number higher than 1525, the portion included in the image obtained from the data generated by the imaging device 13 at the first tilt position is also not included in the image obtained from the data generated by the imaging device at the second tilt position. However, if the stepper motor has a revolution number less than 1525, at least a part of the portion included in the image obtained from the data generated by the imaging device 13 at the first tilt position is included in the image obtained from the data generated by the imaging device 13 at the second tilt position.

Accordingly, the pan value and the tilt value are differently determined at each zoom position because viewing angles at each zoom position are different. Since a viewing angle decreases as zooming-in increases, the pan value and the tilt value decrease as shown in Table 1.

The control data shown in Table 1 may vary according to monitoring camera manufacturers. Specifications of components, for example, a zoom lens and a motor, vary according to manufacturers, and monitoring cameras including such components have different characteristics according to ways of assembling the components. Accordingly, the memory 50 may store control data of various monitoring camera manufacturers.

The control data may be stored in a memory other than the memory 50 as long as the memory can store the above control data. A case where the control data is stored in the memory 50 will be explained for convenience.

When a first region is an image having (horizontal X pixels)×(vertical Y pixels) on the display unit of the terminal, if the data receiving unit 70 receives a signal indicating to display a second region, wherein the second region is selected by a user, as an image having (horizontal X pixels)×(vertical Y pixels), the second region selected by the user may be accurately displayed on the display unit of the terminal by using the control data stored in the memory 50. This will be explained in detail.

A zoom value used by the zoom control unit 21 to move the zoom lens 11 according to a ratio of the size of an image Im1 having (horizontal X pixels)×(vertical Y pixels) displayed on the display unit of the terminal to the size of a second region SA that is selected by the user is determined from the control data stored in the memory 50. For example, if the image Im1 displayed on the display unit of the terminal has a size of (horizontal 350 pixels)×(vertical 282 pixels) and the second region SA has a size of (horizontal 175 pixels)×(vertical 141 pixels), two times (2×) zooming is performed. Accordingly, if a current zoom position is a first zoom position, the zoom value used by the zoom control unit 21 to move the zoom lens 11 from the first zoom position to a fourth zoom position is determined to be 150.

A pan value at a current zoom position according to the number of horizontal pixels from the center C1 of the image Im1 having (horizontal X pixels)×(vertical Y pixels) displayed on the display unit of the terminal to the center C2 of the second region SA is determined from the control data stored in the memory 50. For example, if the number of horizontal pixels from the center C1 of the image Im1 displayed on the display unit of the terminal to the center C2 of the second region SA is 87 and the current zoom position is the first zoom position, a pan value is determined to be approximately 611 (7.0228×87≈611).

Likewise, a tilt value at a current zoom position according to the number of vertical pixels from the center C1 of the image Im1 having (horizontal X pixels)×(vertical Y pixels) displayed on the display unit of the terminal to the center C2 of the second region SA is determined from the control data stored in the memory 50.

Once the zoom value, the pan value, and the tilt value are determined in this way, the zoom control unit 21 controls the zoom lens 11 according to the zoom value, the pan control unit 23 pans the image acquiring unit 10 according to the pan value, and the tilt control unit 25 tilts the image acquiring unit 10 according to the tilt value.

When the second region SA of the image Im1 of FIG. 2A is selected by the user, a related art monitoring camera may display a distorted image Im2' as shown in FIG. 2C, on the display unit of the terminal, and the monitoring camera of FIG. 3 may display an image Im2 as shown in FIG. 2B on the display unit of the terminal.

However, even after performing zooming using the control data, since the control data varies according to digital camera manufacturers or ways of assembling monitoring camera components as described above, the distorted image Im2' as shown in FIG. 2 may be acquired.

Accordingly, the CPU 100 detects an error of the control data, that is, the zoom value, the pan value, and/or the tilt value stored in the memory 50. The CPU 100 may be an example of an error detecting unit. The error detecting unit may detect the error by comparing first image data, which is data of an image of the first region displayed on the terminal, with second image data which is data of an image of the second region generated after zooming panning and tilting have been completed. In order to compare the first image data with the second image data, the error detecting unit performs frequency conversion on the first image data and the second image data, and compares the first image data with the second image data in the frequency domain.

Referring to FIG. 2C, A is the center of the second region SA selected by the user, and A' is the center of the distorted image Im2'. That is, a center coordinate error amounting to a difference between the point A and the point A' occurs in the distorted image Im2'. A dotted line 1' is a horizontal direction of the second region SA in the distorted image Im2', and I is a horizontal direction of the second region SA selected by the user. That is, a rotation angle error of α occurs in the distorted image Im2', compared to the image of the second region SA.

The error detecting unit may detect the error of the control data by comparing the second image data with desired image data, and detecting a center coordinate error and a rotation angle error.

A method of detecting a center coordinate error and a rotation angle error will be explained with reference to FIGS. 4 through 6 below.

Figure 4:
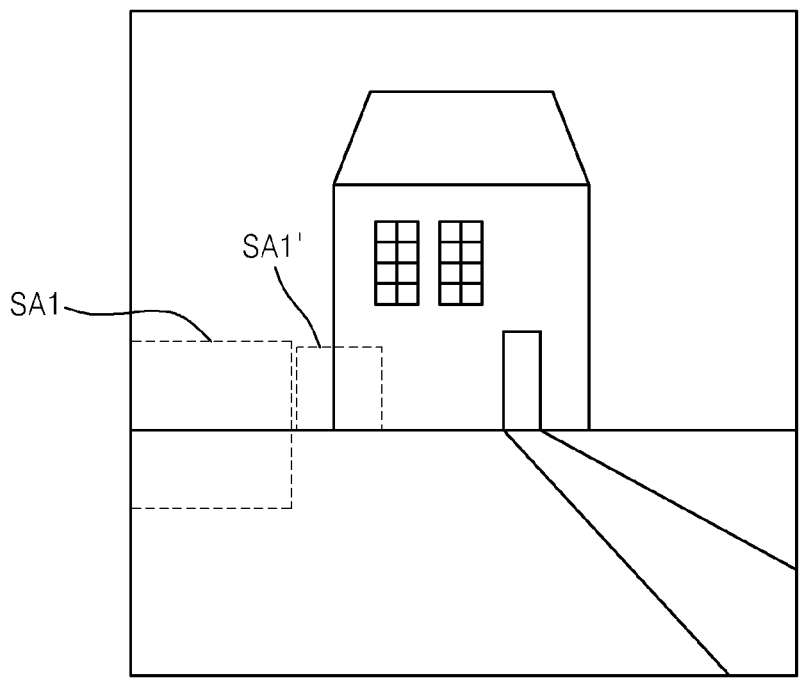
FIG. 4 illustrates an image of a first region displayed on a terminal.

FIG. 4 illustrates an image of a first region displayed on a terminal. FIG. 5 illustrates states where frequency conversion is performed on second image data and first image data of the image of the first region of FIG. 4. FIG. 6 is a conceptual view illustrating states in which size change, rotation, and scaling are performed on frequency blocks.

In FIG. 4, the image of the first region is an arbitrary image for explaining a method of detecting an error. A portion SA1 is a second region selected by a user. SA1' is a portion corresponding to a resultant image generated due to a zooming/panning/tilting error on the image of the first region.

Figure 5:
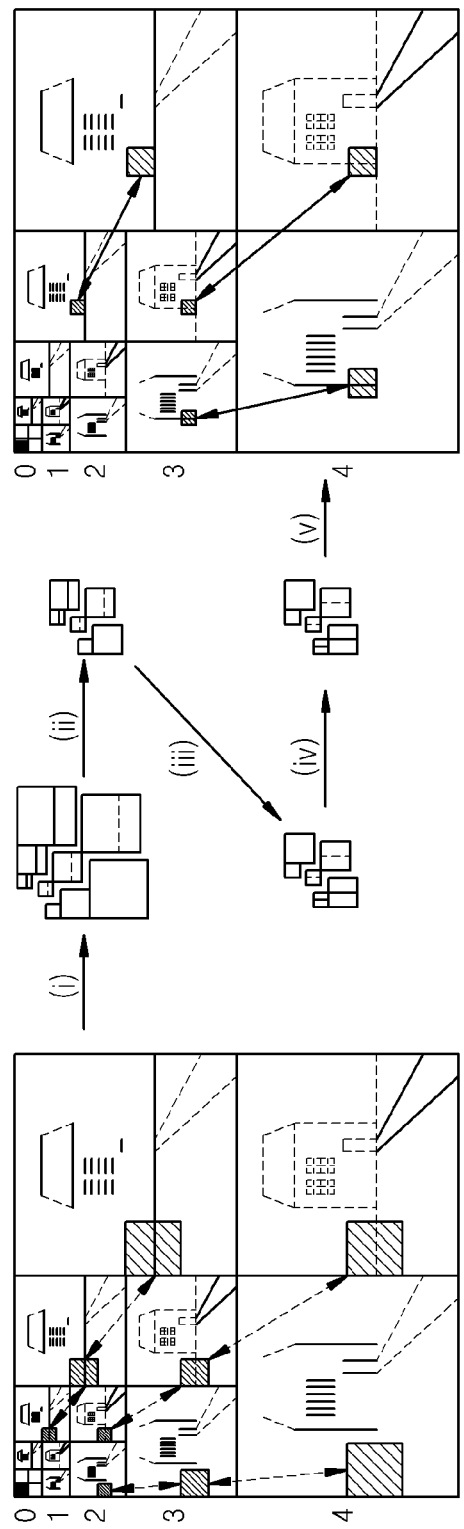
FIG. 5 illustrates states where frequency conversion is performed on second image data and first image data of the image of the first region of FIG. 4.

FIG. 5 illustrates states where frequency conversion is performed on first image data of the image of the first region of FIG. 4 displayed on the terminal, and second image data of the resultant image generated due to the zooming/panning/tilting error. Wavelet transformation is used as an example of the frequency conversion. In FIG. 5, a hatched portion on the left side of FIG. 5 is the second region selected by the user, and a hatched portion on the right side of FIG. 5 is an image region of the second image data corresponding to the resultant image.

The first image data on which the wavelet transformation has been performed is converted into four (4) sub-images to generate an LL block using a low pass filter in horizontal and vertical directions, an HL block using a high pass filter in the vertical direction, an LH block using a high pass filter in the horizontal direction, and an HH block using a high pass filter in the vertical and horizontal directions. Since the HL block includes a vertical frequency error component, horizontal components are present, and since the LH block includes a horizontal frequency error component, vertical components are present. Also, the HH block includes diagonal components.

Since the LL block uses the low pass filter in both the vertical and horizontal directions, an approximate image of a first image corresponding to the first image data is generated. If the filtering is repeated on the approximate image, frequency conversion may be performed to have frequency blocks with a plurality of levels as shown in FIG. 5.

A value corresponding to a difference between frequency blocks of two images generated through the frequency conversion may be obtained. To this end, size change, rotation and/or scaling are performed on the frequency blocks, which correspond to the second region, on the left side of FIG. 5 and frequency blocks, which correspond to the resultant image, on the right side of FIG. 5. Fractional linear affine transformation may be used for the size change, the rotation and/or the scaling. The size change, the rotation, and the scaling of the frequency blocks will be explained with reference to FIG. 6 in detail.

Figure 6:
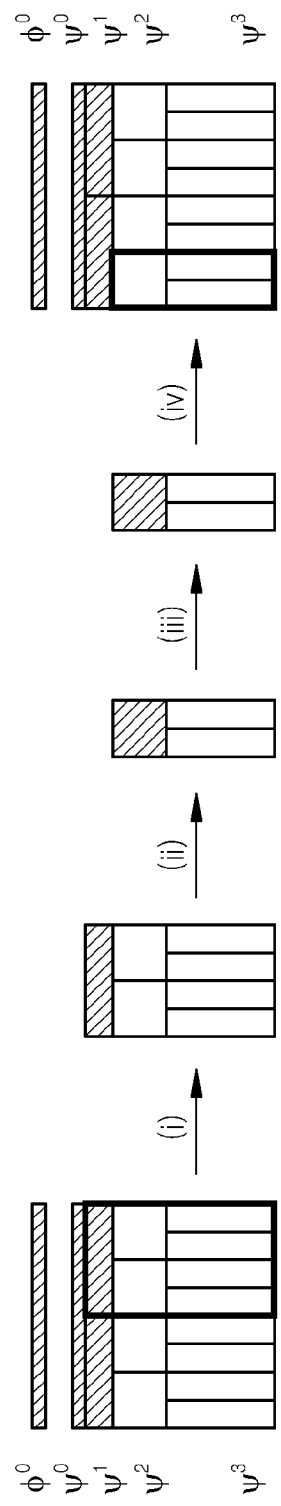
FIG. 6 is a conceptual view illustrating states in which size change, rotation, and scaling are performed on frequency blocks.

FIG. 6 is a conceptual view illustrating a state where size change, rotation, and scaling are performed on frequency blocks. Among frequency blocks on the left side of FIG. 6, frequency blocks surrounded by a thick line are frequency blocks corresponding to the resultant image.

The frequency blocks of the resultant image generated due to the zooming/panning/tilting error are extracted (i), and size change, rotation and/or scaling are performed on the frequency blocks (ii, iii). The frequency blocks on which the size change, the rotation and/or the scaling have been performed are compared with frequency blocks of a desired image (iv). The size change, the rotation and/or the scaling may be repeated until the frequency blocks of the resultant image and the frequency blocks of the desired image are identical to each other may be detected. When the frequency blocks corresponding to the resultant image and the frequency blocks of the desired image are identical to each other, values for the size change, the rotation and/or the scaling are detected, and the detected values may be used to detect a center coordinate error and/or a rotation angle error. For example, a value for the size change may be used to correct a step value for a stepper motor, a value for the rotation may be used to detect a rotation angle error, and a value corresponding to the scaling may be used to detect a zoom ratio error. As a result, errors of the zoom value, the pan value, and/or the tilt value may be detected by using the detected values.

Accordingly, the error of the control data may be detected by comparing the first image data with the second image data of the resultant image generated due to the zooming/panning/tilting error in the frequency domain. Although the wavelet transformation is used for the frequency conversion and affine transformation may be used for the size change, the present inventive concept is not limited thereto. Accordingly, various algorithms typically used in image processing may be used.

The error detecting unit updates the memory 50 by using the errors of the zoom value, the pan value and/or the tilt value to change the control data stored in the memory 50 to new control data. That is, accurate control data that can be currently used in the monitoring camera can be stored in the memory 50.

A related art monitoring camera has a problem in that since control data of a monitoring camera may vary according to various reasons including differences between monitoring camera manufacturers, a distorted image may be obtained even after zooming/panning/tilting is performed using the control data. In order to address this problem, for example, control data for various ways of assembling components of the monitoring camera should be stored and thus an error should be directly corrected.

However, the monitoring camera of FIG. 3 can check whether an error occurs because the error detecting unit compares the first image data of the image of the first region, which is an original image, with the second image data of the image of the second region generated during the zooming/panning/tilting in the frequency domain.

Even if an error occurs, the error detecting unit can detect an error of the control data stored in the memory 50, and can correct the error by updating the control data by using detected values without incurring additional costs.

Figure 7:
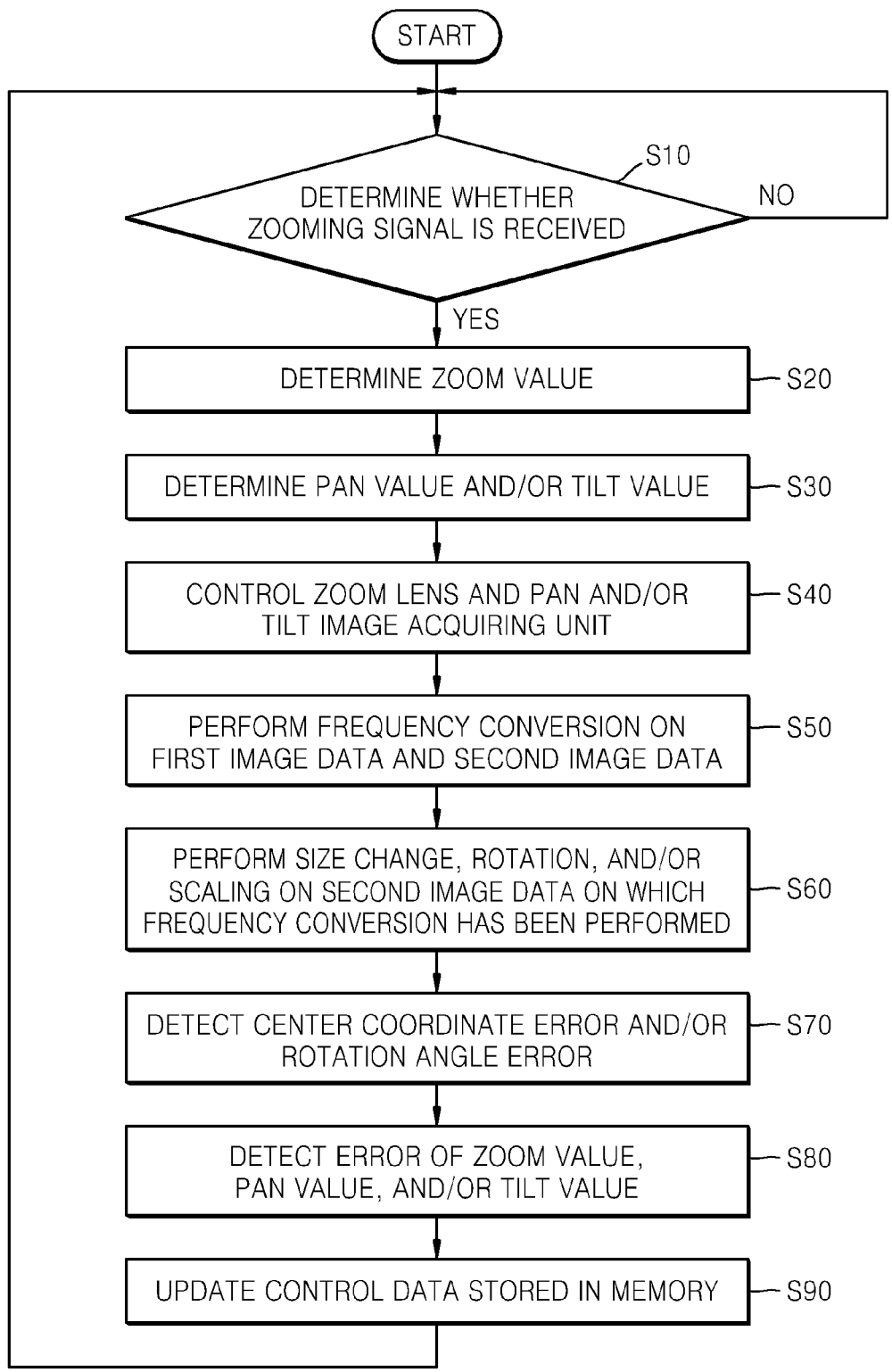
FIG. 7 is a flowchart illustrating a method of controlling a monitoring camera, according to an embodiment of the present invention.

FIG. 7 is a flowchart of a method of controlling a monitoring camera, according to an exemplary embodiment. The method performs zooming, panning and/or tilting according to data input from a terminal via a network. The monitoring camera includes an image acquiring unit, a zoom control unit, a pan control unit, a tilt control unit, a memory storing control data, and an error detecting unit, which may correspond to the elements shown in FIG. 3. The control data stored in the memory includes a zoom value, a pan value at each zoom position, and a tilt value at each zoom position.

The method transmits image data to be displayed as an image having (horizontal X pixels)×(vertical Y pixels) on a display unit of the terminal via the network. In operation S10, it is determined whether a zooming signal indicating to perform zooming on a second region that is a part of the displayed image and selected by a user is received from the terminal via the network. If it is determined in operation S10 that the zooming signal is received from the terminal via the network, the method proceeds to operation S20. In operation S20, a zoom value used by the zoom control unit to move a zoom lens according to a ratio of the size of the displayed image, that is, an image of a first region, to the size of an image of the second region selected by the user is determined from the control data stored in the memory. In operation S30, a pan value and/or a tilt value are determined from the control data stored in the memory. The pan value and/or the tilt value are values at a current zoom position.

In operation S40, the zoom lens is controlled by using the zoom value and the image acquiring unit is panned and/or tilted by using the pan value and/or the tilt value.

Once the zoom lens control, the panning and/or the tilting are completed, second image data of the image of the second region selected by the user is generated. However, since the control data may not be accurate for zooming/panning/tilting of the monitoring camera according to monitoring camera manufacturers, ways of assembling monitoring camera components, or the like, it should be determined whether an error occurred during the zooming/panning/tilting. That is, it is determined whether errors are included in the zoom value, the pan value and/or the tilt value stored in the memory by using the second image data.

Next, errors of the control data are detected by comparing the second image data with first image data of the image of the first region. To this end, in operation S50, frequency conversion is performed on the first image data and the second image data.

In operation S60, size change, rotation and/or scaling may be performed on the second image data, on which the frequency conversion has been performed, by using various functions. The error detecting unit determines whether the second image data is identical to part of the first image data by performing the size change, the rotation and/or the scaling on the second image data on which the frequency conversion has been performed, and acquires a size change value, a rotation value and/or a scaling value when the second image data is identical to part of the first image data. In operation S70, a center coordinate error and a rotation angle error are detected by using the size change value, the rotation value and/or the scaling value.

In operation S80, errors included in the zoom value, the pan value and/or the tilt value of the control data are calculated by using the center coordinate error and/or the rotation angle error. In operation S90, the control data stored in the memory is updated with new control data by using the calculated error.

A related art monitoring camera has a problem in that since control data of a monitoring camera may vary according to various reasons including differences between monitoring camera manufacturers, a distorted image may be obtained even after zooming/panning/tilting using the control data. In order to address this problem, for example, control data for every way of assembling components of the monitoring camera should be stored and thus an error should be directly corrected.

However, the method of FIG. 7 can check whether errors occur because the error detecting unit compares the first image data of the image of the first region, which is an original image, with the second image data of the image of the second region generated during zooming/panning/tilting in the frequency domain.

Even if an error occurs, the error detecting unit can detect errors of the control data stored in the memory, and can correct the errors by updating the control data by using detected values without incurring additional costs.

A program for executing the method of FIG. 7 and modifications of the method of FIG. 7 may be stored in a recording medium. For example, the recording medium may be the memory 50 as shown in FIG. 2, or any other recording medium. Examples of the recording medium include a magnetic storage medium, such as a ROM, a floppy disk, or a hard disk, and an optically readable medium, such as a compact disk-read only memory (CD-ROM) or a digital versatile disk (DVD).

While the present inventive concept has been particularly shown and described with reference to exemplary embodiments thereof, it will be understood by one of ordinary skill in the art that various changes in form and details may be made therein without departing from the spirit and scope of the present inventive concept as defined by the following claims. Therefore, the scope of the inventive concept is defined not by the detailed description of the exemplary embodiments but by the appended claims.

What is claimed is:
1. A camera comprising:
 a control unit which controls a camera to capture a first image and perform at least one of zooming, panning and tilting to generate a second image, according to control data;

a memory which stores the control data comprising:
 a set of zoom values for corresponding zoom positions, each zoom value being used to move the camera from one zoom position to another zoom position; and
 at least one of a set of pan values per pixel, each pan value per pixel being used to pan the camera by one (1) pixel of image data at a corresponding zoom position, and a set of tilt values per pixel, each tilt value pixel being used to tilt the camera by one (1) pixel of the image data at the corresponding zoom position, and the pan values per pixel and the tilt values per pixel being in inverse proportion to the zoom values.

2. The camera of claim 1, wherein, in order to generate the second image, the control unit determines, from the control data, at least one of a zoom value used for zooming according to a ratio of a size of the first image to a size of the second image, a pan value at a current zoom position according to a number of horizontal pixels from a center of the first image to a center of the second image, and a tilt value at the current zoom position according to a number of vertical pixels from the center of the first image to the center of the second image.

3. The camera of claim 1 further comprising:
 a control unit which controls the camera to capture a first image and generate a second image through at least one operation of zooming, panning and tilting, according to the control data; and
 an error detecting unit which detects an error of the control data by comparing the first image with the second image which is generated by at least one of zooming, panning and tilting of the first image,
 wherein the comparing the first image with the second image comprises:
  performing frequency conversion on the first image and the second image; and
  comparing the frequency-converted first image with the frequency-converted second image.

4. The camera of claim 3, wherein the image of the region, corresponding to the second image, within the first image is an image which is to be obtained through at least one of zooming, panning and tilting by an amount of an actual input value intended to generate the second image.

5. The monitoring camera of claim 1, further comprising an error detecting unit which detects an error of the control data, the error comprising a difference between the first image and the second image which is generated by at least one of zooming, panning and tilting of the first image,
 wherein the error detecting unit changes the control data stored in the memory by applying the error of the control data, and
 wherein the changed control data is used to generate at least one of zooming, panning and tilting at a next time.

6. A method of controlling a camera, the method comprising:
 storing control data in a memory; and
 controlling a camera to capture a first image and perform at least one of zooming, panning and tilting to generate a second image, according to the control data
 wherein the control data comprises:
  a set of zoom values for corresponding zoom positions, each zoom value being used to move the camera from one zoom position to another zoom position; and
  at least one of a set of pan values per pixel, each pan value per pixel being used to pan the camera by one (1) pixel of image data at a corresponding zoom position, and a set of tilt values per pixel, each tilt value per pixel being used to tilt the camera by one (1) pixel of the image data at the corresponding zoom position, and the pan values per pixel and the tilt values per pixel being in inverse proportion to the zoom values.

7. The method of claim 6, wherein the controlling the camera to perform the at least one of zooming, panning and tilting comprises:
 determining from the control data at least one of a zoom value used for zooming according to a ratio of a size of the first image to a size of the second image, a pan value at a current zoom position according to a number of horizontal pixels from a center of the first image to a center of the second image, and a tilt value at the current zoom position according to a number of vertical pixels from the center of the first image to the center of the second image.

8. The method of claim 6 further comprising:
 controlling the camera to capture a first image and generate a second image through at least one operation of zooming, panning and tilting, according to the control data; and
 detecting an error of the control data by comparing the first image with the second image which is generated by at least one of zooming, panning and tilting of the first image,
 wherein the comparing the first image with the second image comprises:
  performing frequency conversion on the first image and the second image; and
  comparing the frequency-converted first image with the frequency-converted second image.

9. The method of claim 8, wherein the image of the region, corresponding to the second image, within the first image is an image which is to be obtained through at least one of zooming, panning and tilting by an amount of an actual input value intended to generate the second image.

10. The method of claim 6, further comprising:
 detecting an error of the control data, the error comprising a difference between the first image and the second image which is generated by at least one of zooming, panning and tilting of the first image; and
 changing the control data, which is stored in the memory, by applying the error of the control data,
 wherein the changed control data is used to generate at least one of zooming, panning and tilting at a next time.

11. A non-transitory computer readable recording medium having recorded thereon a program for executing the method of claim 6.

12. The camera of claim 3, wherein the comparing the intended image with the second image comprises:
 performing frequency conversion on the intended image and the second image; and
 comparing the frequency-converted intended image with the frequency-converted second image.

13. The camera of claim 12, wherein the error comprises at least one of a center coordinate error and a rotation angle error between the portion of the frequency-converted first image and the frequency-converted second image.

14. The camera of claim 13, wherein the error detecting unit detects the error by:
 performing at least one of size change, rotation and scaling on the frequency-converted second image; and
 acquiring at least one of a size change value, a rotation value and a scaling value when the frequency-converted second image on which the at least one of the size change, the rotation and the scaling has been performed is identical to the frequency-converted intended image.

15. The camera of claim 14, wherein the size change value is used to correct a step value for the zooming, the rotation value is used to detect a rotation angle error, and the scaling value is used to detect a zoom ratio error, and wherein the size change value, the rotation value and the scaling value are used to correct the error of the control data.

16. The camera of claim 14, wherein the error detecting unit changes the control data stored in the memory by using the acquired at least one of the size change value, the rotation value and the scaling value, and wherein the changed control data is used in a next at least one of zooming, panning and tilting of the camera.

17. The method of claim 8, wherein the comparing the intended image with the second image comprises:

performing frequency conversion on the intended image and the second image; and comparing the frequency-converted intended image with the frequency-converted second image.

18. The method of claim 17, wherein the error comprises at least one of a center coordinate error and a rotation angle error between the portion of the frequency-converted first image and the frequency-converted second image.

19. The method of claim 18, wherein the detecting the error of the control data comprises:

performing at least one of size change, rotation and scaling on the frequency-converted second image; and acquiring at least one of a size change value, a rotation value and a scaling value when the frequency-converted second image on which the at least one of the size change, the rotation and the scaling has been performed is identical to the frequency-converted intended image.

20. The method of claim 19, wherein the size change value is used to correct a step value for the zooming, the rotation value is used to detect a rotation angle error, and the scaling value is used to detect a zoom ratio error, and wherein the size change value, the rotation value and the scaling value are used to correct the error of the control data.

21. The method of claim 19, further comprising changing the control data stored in the memory by using the acquired at least one of the size change value, the rotation value and the scaling value, wherein the changed control data is used in a next at least one of zooming, panning and tilting of the camera.

* * * * *